(12) United States Patent
Ohara et al.

(10) Patent No.: US 9,160,460 B2
(45) Date of Patent: Oct. 13, 2015

(54) NOISE CANCELLING DEVICE

(71) Applicant: Panasonic Corporation, Osaka (JP)

(72) Inventors: Masamichi Ohara, Osaka (JP);
Yoshitaka Seto, Osaka (JP); Takeo Kanamori, Osaka (JP); Yutaka Banba, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 444 days.

(21) Appl. No.: 13/623,327

(22) Filed: Sep. 20, 2012

(65) Prior Publication Data
US 2013/0070938 A1 Mar. 21, 2013

(30) Foreign Application Priority Data

Sep. 21, 2011 (JP) ................................. 2011-205428

(51) Int. Cl.
*H04B 15/00* (2006.01)
*H04R 3/00* (2006.01)

(52) U.S. Cl.
CPC ................ *H04B 15/00* (2013.01); *H04R 3/005* (2013.01)

(58) Field of Classification Search
CPC ................................ H04B 15/00; H04R 3/005
USPC .................................. 381/94.1, 71.1; 700/94
See application file for complete search history.

(56) References Cited

U.S. PATENT DOCUMENTS

| 2009/0197558 A1* | 8/2009 | Shiotsu et al. | ................. 455/296 |
| 2010/0246851 A1* | 9/2010 | Buck et al. | .................... 381/94.1 |
| 2011/0182436 A1* | 7/2011 | Murgia et al. | ................. 381/71.1 |
| 2011/0254979 A1* | 10/2011 | Okazaki | ..................... 348/231.4 |

FOREIGN PATENT DOCUMENTS

| JP | 11-205900 | 7/1999 |
| JP | 2006-211436 | 8/2006 |

\* cited by examiner

*Primary Examiner* — Fan Tsang
*Assistant Examiner* — Eugene Zhao
(74) *Attorney, Agent, or Firm* — Panasonic Patent Center

(57) ABSTRACT

A noise cancelling device includes an extracting unit configured to extract a first noise from a signal, the signal being based on an input audio signal, a storing unit configured to store noise characteristic information on a second noise, the second noise remaining after subtracting the extracted first noise from the signal based on the audio signal. And the device further includes a cancelling unit configured to perform cancelling processing for cancelling a noise on the input audio signal based on the first noise and the noise characteristic information on the second noise.

8 Claims, 7 Drawing Sheets

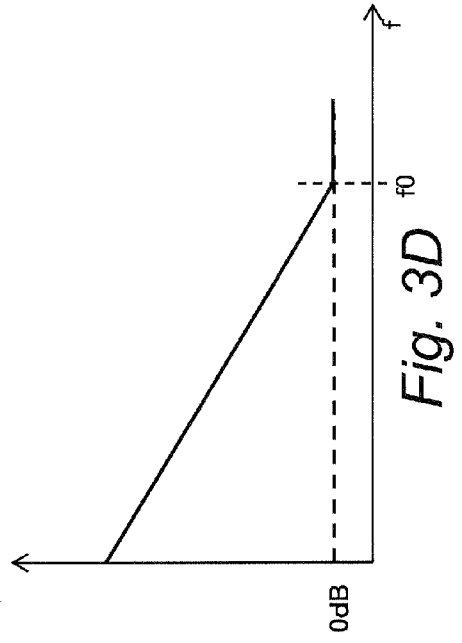
Fig. 3B
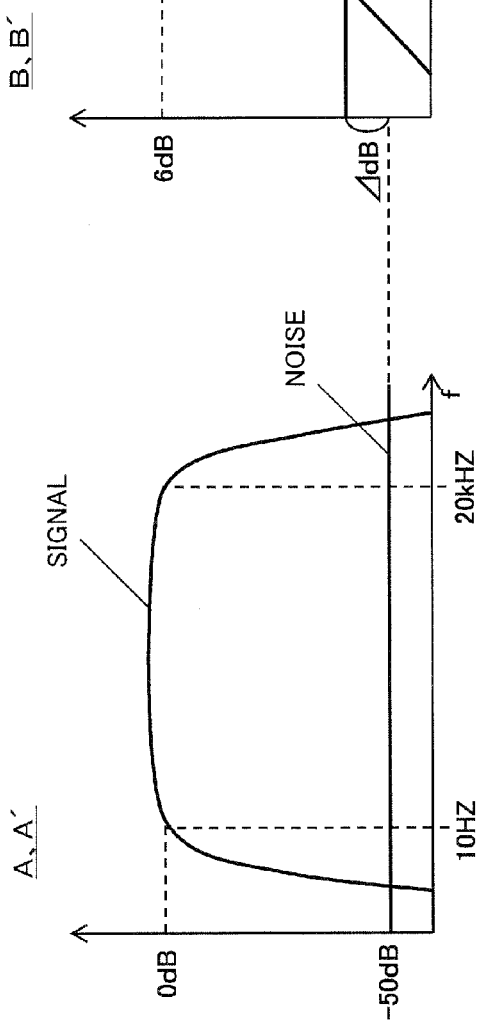
Fig. 3A
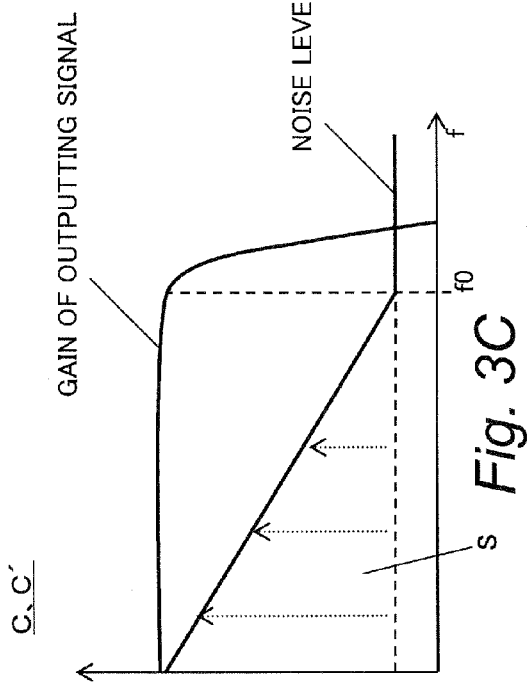
Fig. 3D
Fig. 3C

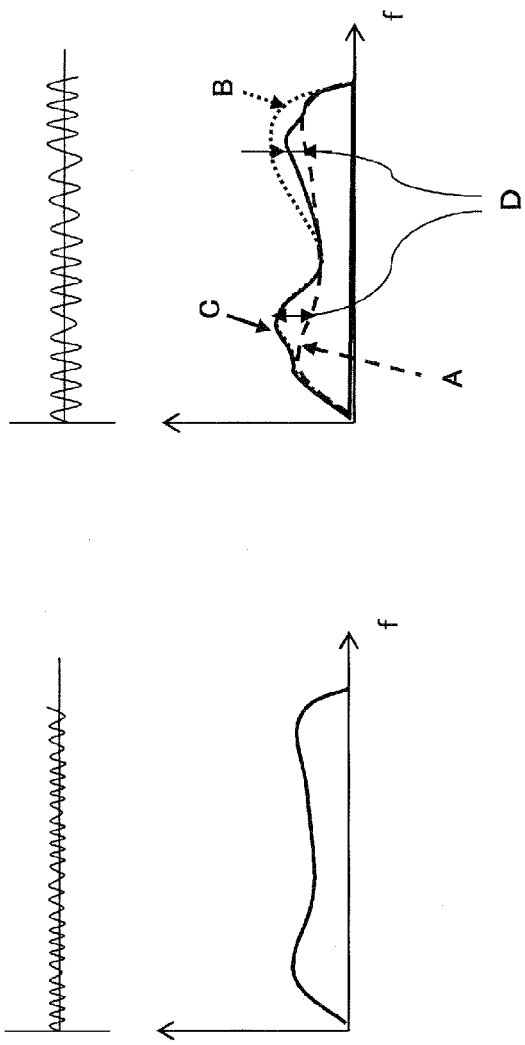

NOISE CANCELLING DEVICE

BACKGROUND

1. Technical Field

The present disclosure relates to a noise cancelling device.

2. Related Art

Conventional noise cancelling devices subtract operation noise which is produced as a result of an operation of driving a zoom lens and the like from obtained original audio data to provide audio data of clearer sound in sound recording or video recording.

For example, a noise cancelling device as disclosed in JP 2006-211436 A is known.

Recently, as digital cameras have been downsized, the source of the operation noise, such as a zoom lens, and a microphone for collecting ambient sounds for obtaining audio signals have been getting nearer to each other. On the other hand, digital cameras capable of capturing not only a still picture but also a motion picture by multiplying and recording the audio signals have been more widely used. Under such a circumstance, operation noise needs to be addressed more than ever.

SUMMARY

In view of the above described problem, the present disclosure provides a noise cancelling device capable of more properly reducing the operation noise and an imaging device equipped with the noise cancelling device.

According to an aspect, a noise cancelling device includes an extracting unit configured to extract a first noise from a signal, the signal being based on an input audio signal, a storing unit configured to store noise characteristic information on a second noise, the second noise remaining after subtracting the extracted first noise from the signal based on the audio signal, and a cancelling unit configured to perform cancelling processing for cancelling a noise on the input audio signal based on the first noise and the noise characteristic information on the second noise.

According to the aspect, a noise cancelling device capable of more properly reducing the operation noise and an imaging device equipped with the noise cancelling device can be provided.

BRIEF DESCRIPTION OF DRAWINGS

FIGS. 3A to 3D are a diagram for describing signal level changes and noise level changes in the directed synthesizing unit;

FIGS. 7A to 7C are diagrams for describing the specific method of recording of the noise characteristic data.

DETAILED DESCRIPTION OF EMBODIMENTS

[First Embodiment]

A noise cancelling device according to a first embodiment will be described below with reference to the drawings. In the description below, an imaging device equipped with the noise cancelling device according to the first embodiment will be described by taking a digital camera as an example. Note that, the noise cancelling device according to the example is not limited to be applied to the digital camera but may be applied to other devices which may produce noise such as a digital video camera.

[1. Configuration]

First, a configuration of a digital camera (imaging device) 100 will be described with reference to FIG. 1.

[1-1. Configuration of the Digital Camera 100]

Figure 1:
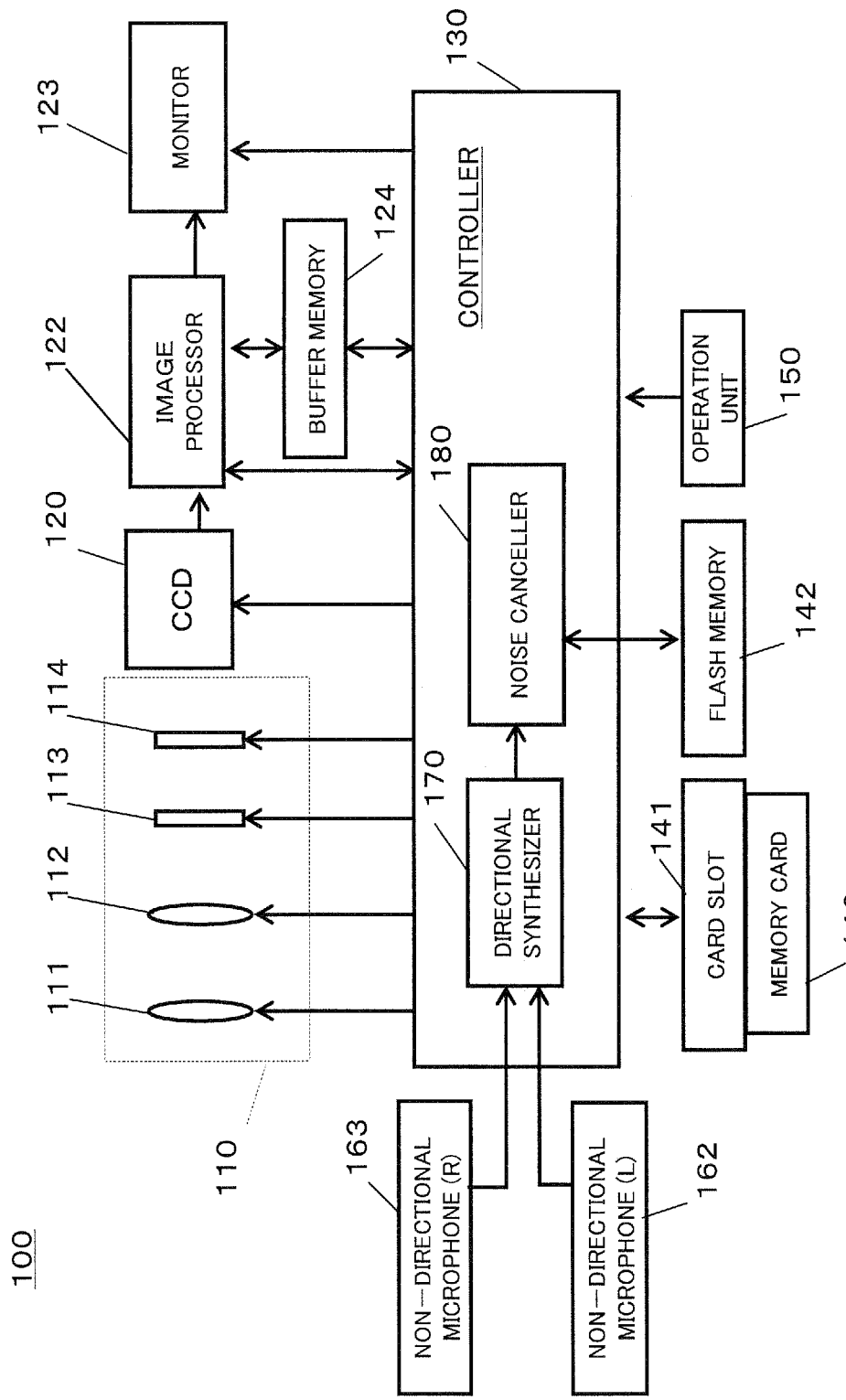
FIG. 1 is an electrical block diagram of a digital camera.

FIG. 1 is an electrical block diagram of the digital camera 100. As shown in the figure, the digital camera 100 uses a CCD image sensor 120 to capture an image of a subject formed through an optical system 110. The CCD image sensor 120 generates image information based on the captured image of the subject. The image information generated as a result of capturing the image is subjected to various types of processing in an image processor 122. The generated image information is recorded in a flash memory 142 or a memory card 140. The image information recorded in the flash memory 142 or the memory card 140 is displayed on a liquid crystal monitor 123 in response to reception of a user's operation on an operation unit 150.

The optical system 110 includes a focus lens 111, a zoom lens 112, a diaphragm 113, and the like. Although not shown in the figure, the optical system 110 may include an optical image stabilizer (OIS). Any number of various lenses or any groups of various lenses may be included in the optical system 110.

The focus lens 111 is used for adjusting a focusing state of the subject. The zoom lens 112 is used for adjusting an angle of view of the subject. The diaphragm 113 is used for adjusting a light quantity incident on the CCD image sensor 120. The shutter 114 is used for adjusting exposure time for the light to be incident on the CCD image sensor 120. The focus lens 111, the zoom lens 112, the diaphragm 113, and the shutter 114 are driven by respectively corresponding driving units such as a DC motor and a stepping motor according to control signals sent from a controller 130.

A buffer memory 124 is storage means that functions as a working memory for the image processor 122, the controller 130, and the like. The buffer memory 124 may be implemented by a DRAM (Dynamic Random Access Memory) or the like.

The card slot 141 is connection means that allows the memory card 140 to be attached and detached. The card slot 141 allows the memory card 140 to be electrically and mechanically connected. The card slot 141 may also be provided with a function for controlling the memory card 140.

The memory card 140 is an external memory that contains a storage device such as a flash memory. The memory card 140 is capable of storing data such as image information to be processed in the image processor 122.

Non-directional microphones L162 and R163 (microphone unit) collect sounds surrounding the digital camera 100 without providing any directional characteristics for the sounds and convert the sounds into electric signals indicating the audio information. The non-directional microphone L162 is located on the left side of the digital camera 100 in the direction horizontally orthogonal to the image taking direction of the digital camera 100. On the other hand, the non-directional microphone 8163 is located on the right side of the digital camera 100 in the direction orthogonal to the image taking direction of the digital camera 100. The audio information converted into the electric signal is recorded in the memory card 140. The non-directional microphone L162 and the non-directional microphone R163 operate when a sound recording mode or a video recording mode is set in the digital camera 100.

The operation unit 150 collectively refers to operation buttons and control levers provided on the body of the digital camera 100 for receiving a user's operation. When the operation unit 150 receives a user's operation, it sends various signals to instruct operations to the controller 130.

The controller 130 controls operations of the respective components composing the digital camera 100. The controller 130 also has a directional synthesizer 170 and a noise canceller 180. The directional synthesizer 170 and the noise canceller 180 will be described in detail later.

The flash memory (storing unit) 142 stores a program and various parameters for causing the controller 130 to perform various operations. The flash memory 142 stores noise characteristic data corresponding to the respective operations such as a zooming operation and a focusing operation, which will be described in detail later.

[1-2. Configuration of the Directed Synthesizing Unit 170]

Figure 2:
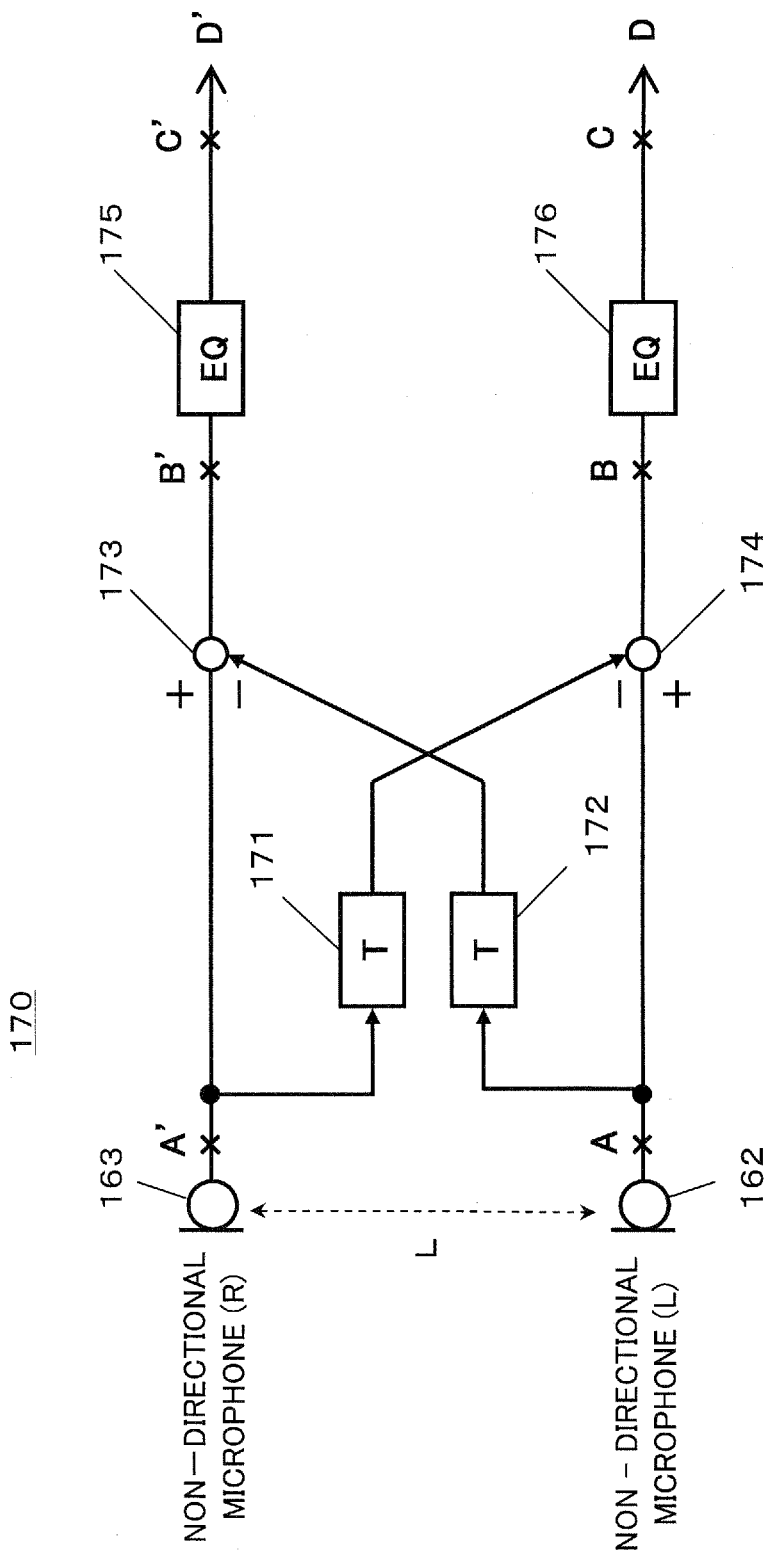
FIG. 2 is a block diagram of signal processing of a directed synthesizing unit.

Next, details of a signal processing operation of the directed synthesizing unit 170 will be described with reference to FIGS. 2 and 3. FIG. 2 is a block diagram of signal processing of the directed synthesizing unit 170, representing a pressure-gradient configuration as an example of a directed synthesizing method. FIG. 3 is a diagram for describing signal level changes and noise level changes in the directed synthesizing unit 170.

As shown in FIG. 2, the directed synthesizing unit 170 according to the example has delay units 171 and 172, mixers 173 and 174, and equalizers 175 and 176.

The audio signal A from the non-directional microphone L162 and the audio signal A' from the non-directional microphone R163 are input into the directional synthesizer 170. The audio signals A and A' shown in FIG. 2 have frequency characteristics as shown in FIG. 3A. That is, as shown in FIG. 3A, the audio signal A from the non-directional microphone L162 and the audio signal A' from the non-directional microphone R163 are at the signal level of 0 dB for the frequency band from 10 Hz to 20 kHz. The signal levels of the audio signals become lower as the frequency decreases from 10 Hz or increases from 20 kHz. As shown in the figure, the audio signals A and A' contain the noise levels of −50 dB.

Next, the audio signal A which is an input from the non-directional microphone L162, is divided into two paths, one of which is input into the delay unit 172. The delay unit 172 is a circuit for delaying the phase of the input signal A by a predetermined time period T. Appropriate directional characteristics can be obtained when the predetermined time period t is set to L/V (sec), where the sonic speed is V (m/sec) and the distance between the non-directional microphones L162 and R163 denoted by a dashed line in the figure is L (m). The non-directional microphones L162 and R163 collect sounds surrounding the digital camera 100. Among the sounds collected by the non-directional microphones L162 and R163, a sound produced exactly on the left of the digital camera 100, for example, will be first collected by the non-directional microphone L162, and after t (sec), collected by the non-directional microphone R163. That is, the audio signal collected by the non-directional microphone R163 contains audio components produced exactly on the left of the digital camera 100 after t (sec) from audio components produced exactly on the left of the digital camera 100 among the audio signal collected by the non-directional microphone L162. The audio signal, the phase of which is delayed by the delay unit 172, is input into the mixer 173. The audio signal which is an input from the non-directional microphone R163 and the audio signal which is an input from the delay unit 172 undergo subtraction processing in the mixer 173. Then, the mixer 173 outputs a signal B' which is produced by largely attenuating the audio signal from the non-directional microphone R163. At this moment, in the audio signal A' from the non-directional microphone R163, a component that is largely contributing to the audio signal from the non-directional microphone L162 is subtracted so that the audio signal from the right side is emphasized.

Similarly, the audio signal A' which is an input from the non-directional microphone R163 is divided into two paths, one of which is input into the delay unit 171. The delay unit 171 is a circuit for delaying the phase of the input signal A' by a predetermined time period "t" as in the delay unit 172. In the mixer 174, the delayed signal is subtracted from the audio signal A, which is input from the non-directional microphone 1162. Consequently, the audio signal A from the non-directional microphone 1162 has had a component that is largely contributing to the audio signal from the non-directional microphone R163 subtracted so that the audio signal from the left side is emphasized.

At this moment, the audio signals B and B' in FIG. 2 are shown as in FIG. 3B. As shown in the figure, the audio signals B and B' have their level peaks near the frequency f0 (=V/2 L) against the audio signal input from the front of the digital camera 100. In this example, the peak of the frequency f0 is at the level around 6 dB. On the other hand, in the case where a white noise (random noise) is main component, the noise level increases by about 3 dB from the state shown in FIG. 3A. Then, as shown in FIG. 3B, the level on the high frequency side of the level peak near the frequency f0 rapidly attenuates, and the level on the low frequency side of the level peak near the frequency f0 attenuates at −6 dB/oct.

For the signal level on the low frequency side of the level peak near the frequency f0, the equalizers 175 and 176 are used to level out the frequency. The equalizers 175 and 176 have a feature of amplifying the frequency component lower than the frequency f0 by 6 dB/oct as shown in FIG. 3D.

Accordingly, the respective audio signals B and B' which are subsequently input from the mixers 173 and 174 obtain the frequency characteristics as shown in FIG. 3C by passing through the equalizers 175 and 176. As a result, the audio signal (signal output gain) has its frequency band lower than the frequency f0 leveled out.

However, as denoted by dotted lines in FIG. 3C, the noise level is also amplified as well as the audio signal through the equalizers 175 and 176. That is, the directed synthesizing by the directed synthesizing unit 170 performed on the audio signal from the non-directional microphones L162, R163 has a side effect of amplifying the noise in the frequency band (S) lower than the frequency f0 in FIG. 3C. The noise component amplified here is mainly composed of a weakly correlated signal among the noise output from the non-directional microphones L162, R163. In the case of the imaging device 100, the weakly correlated audio signal is of a mechanical vibration noise made in zooming operation or focusing operation, or the like. That side effect increases the noise, which is a problem.

[1-3-0. About Signal Processing of the Basic Noise Cancelling Unit 180A]

To address the problem, the digital camera 100 according to the first embodiment has a noise cancelling unit 180 to reduce the amplified noise.

Figure 4:
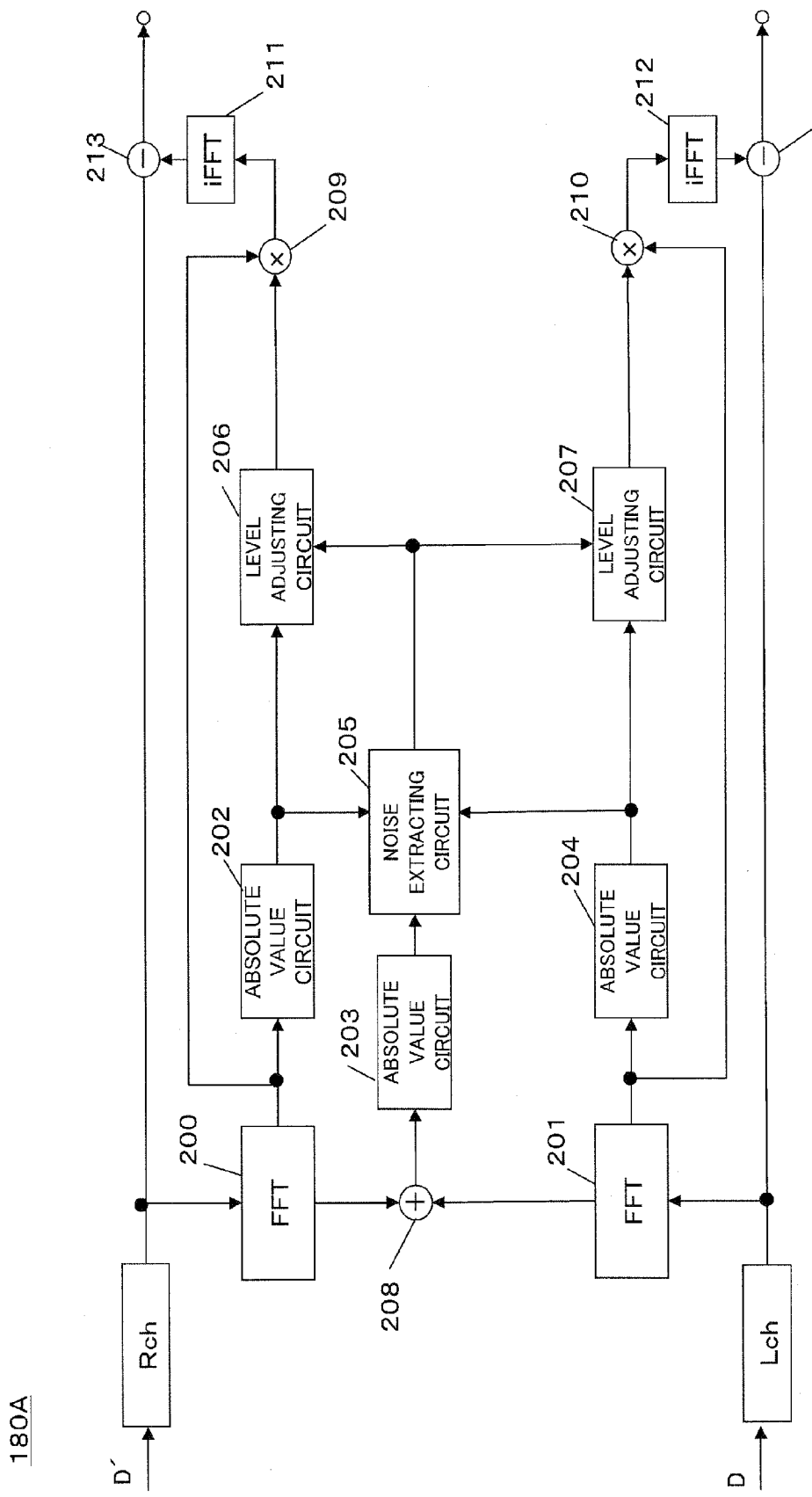
FIG. 4 is a block diagram of a basic noise cancelling unit.

In order to describe details of the operation of the noise cancelling device 180 according to the first embodiment, the signal processing according to the basic configuration of the noise cancelling unit 180 will be described first. FIG. 4 is a block diagram of signal processing of a basic noise cancelling unit 180A. The noise cancelling unit 180 is capable of cancelling an uncorrelated noise such as a mechanical vibration noise made by the zoom lens 112 or the focus lens 111 being driven and a noise made by the electrical circuit from the input audio signal.

As shown in FIG. 4, the basic noise cancelling unit 180A has fast Fourier transform circuits (hereinafter, referred to as "FFT") 200, 201, absolute value circuits 202, 203, 204, a noise extracting circuit 205, level adjusting circuits 206, 207, an adding circuit 208, multiplying circuits 209, 210, inverse fast Fourier transform circuits (hereinafter, referred to as "iFFT") 211, 212, and subtracting circuits 213, 214.

As shown in the figure, an audio signal D from the non-directional microphone L162 side by the directed synthesizing unit 170 is input into L channel (Lch). Similarly, an audio signal D' from the non-directional microphone R163 side by the directed synthesizing unit 170 is input into an R channel (Rch).

The audio signal D' input into the Rch side is divided into two paths. The audio signal in one of the paths on the Rch side is input into the FFT 200. The FFT 200 performs Fourier transform processing on the input Rch side audio signal to divide the signal into audio signals for respective frequency components. The resulting audio signals on the Rch side are schematically described as SRch+NRch for convenience of the later description of the noise extraction. Here, SRch refers to the signal level of Rch, and NRch refers to the noise level of Rch. Similarly, the audio signal on the L channel (Lch) side is divided into two paths. The audio signal in one of the paths on the Lch side is input into the FFT 201. The FFT 201 similarly performs the Fourier transform processing on the input Lch side audio signal to divide the signal into audio signals for respective frequency components. The resulting audio signals on the Lch side are schematically described as SLch+NLch for convenience of the later description of the noise extraction. Here, SLch refers to the signal level of Lch, and NLch refers to the noise level of Lch.

Subsequently, the audio signals on the Rch side which underwent the Fourier transform processing in the FFT 200 are divided into three paths, one of which is input into the adder 208, another of which is input into the absolute value circuit 202, and the other of which is input into the multiplying circuit 209. Similarly, the audio signals on the Lch side which underwent the Fourier transform processing in the FFT 201 are divided into three paths, one of which is input into the adder 208, another of which is input into the absolute value circuit 204, and the other of which is input into the multiplying circuit 210.

The adding circuit 208 adds the result of the Fourier transform processing performed on the audio signals on the Rch side and the result of the Fourier transform processing performed on the audio signals on the Lch side to generate a signal which has suppressed the noise increased by the above described directed synthesizing processing. Each of NRch and NLch is mainly a random noise. On the other hand, SRch and SLch are mainly the audio signals and both of them have strong correlation. Therefore, the signal generated here by the adding circuit 208 is (SRch+SLch)+(NRch+NLch)×√2.

The absolute value circuit 202 extracts amplitude information (|SRch+NRch|) of each frequency component from the audio signals input from the FFT 200 on the Rch side. Similarly, the absolute value circuit 204 extracts amplitude information (|SLch+NLch|) of each frequency component from the audio signals input from the FFT 201 on the Lch side. Similarly, the absolute value circuit 203 extracts amplitude information (|(SRch+SLch)+(NRch+NLch)×√2|) of each frequency component from the output signal from the adding circuit 208.

The amplitude information extracted by the absolute value circuit 202 is divided into two paths, one of which is input into the noise extracting circuit 205, and the other of which is input into the level adjusting circuit 206. The amplitude information extracted by the absolute value circuit 204 is divided into two paths, one of which is input into the noise extracting circuit 205, and the other of which is input into the level adjusting circuit 207. The amplitude information extracted by the absolute value circuit 203 is input into the noise extracting circuit 205.

The noise extracting unit 205 extracts a noise (first noise) by comparing the respective amplitude information (|SRch+NRch|), (|SLch+NLch|), (|(SRch+SLch)+(NRch+NLch)×√2|) input from the absolute value circuits 202, 203, 204. The noise signal (first noise) extracted by the noise extracting unit 205 is input into the level adjusting circuits 206, 207.

The level adjusting circuit 206 references the amplitude information (|SRch+NRch|) on the Rch side which is input from the absolute value circuit 202, and adjusts the level of the noise signal extracted by the noise extracting unit 205 to the level indicated by the amplitude information. The noise signal adjusted by the level adjusting circuit 206 is input into the multiplying circuit 209. Similarly, the level adjusting circuit 207 references the amplitude information (|SLch+NLch|) on the Lch side which is input from the absolute value circuit 204, and adjusts the level of the noise signal extracted by the noise extracting unit 205 to the level indicated by the amplitude information. The noise signal adjusted by the level adjusting circuit 207 is input into the multiplying circuit 210.

The multiplying circuit 209 multiplies the audio signals for the respective frequency components input from the FFT 200 by the noise component which has undergone the level adjustment. Consequently, the noise signal having phase information can be generated. The generated noise signal is input into the iFFT 211. The multiplying circuit 210 multiplies the audio signals for the respective frequency components input from the FFT 201 by the noise component which has undergone the level adjustment. Consequently, the noise signal having phase information can be generated. The generated noise signal is input into the iFFT 212.

The iFFT 211 performs inverse Fourier transform on the noise signal input from the multiplying circuit 209 to regenerate the signal into a time waveform. The noise signal transformed into the time waveform is input into the subtracting circuit 213 and subtracted from the audio signal on the Rch side. Consequently, the audio signal on the Rch side having the noise reduced can be obtained. Similarly, the iFFT 212 performs inverse Fourier transform on the noise signal input from the multiplying circuit 210 to regenerate the signal into a time waveform. The noise signal transformed into the time waveform is input into the subtracting circuit 214 and subtracted from the audio signal on the Lch side. Consequently, the audio signal on the Lch side having the noise reduced can be obtained.

The noise cancelling unit 180A shown in FIG. 4 performs noise-cancellation on the noise (first noise) which is supposed to occur according to a basically ideal algorithm in the digital camera 100. However, there is a case where even the noise extracting unit 205 fails to extract the noise and lets the noise go without catching it, so that a remaining noise component (second noise) which escaped the cancellation may be present. The causes for even the noise extracting unit 205 to fail to extract the noise include, for example, a difference in the sound collection sensitivity among the non-directional microphones L162, R163 due to individual variation and a change over the years of the microphones, an error in the mathematical operation in the above described directed synthesizing processing, and the like. The fact that the audio signals input via the non-directional microphones L162, R163 originally include noise signals which are correlated (for example, the noise transmitted as a sound wave) can also be counted as one of the causes.

[1-3-1. About Signal Processing of the Noise Cancelling Unit 180]

Figure 5:
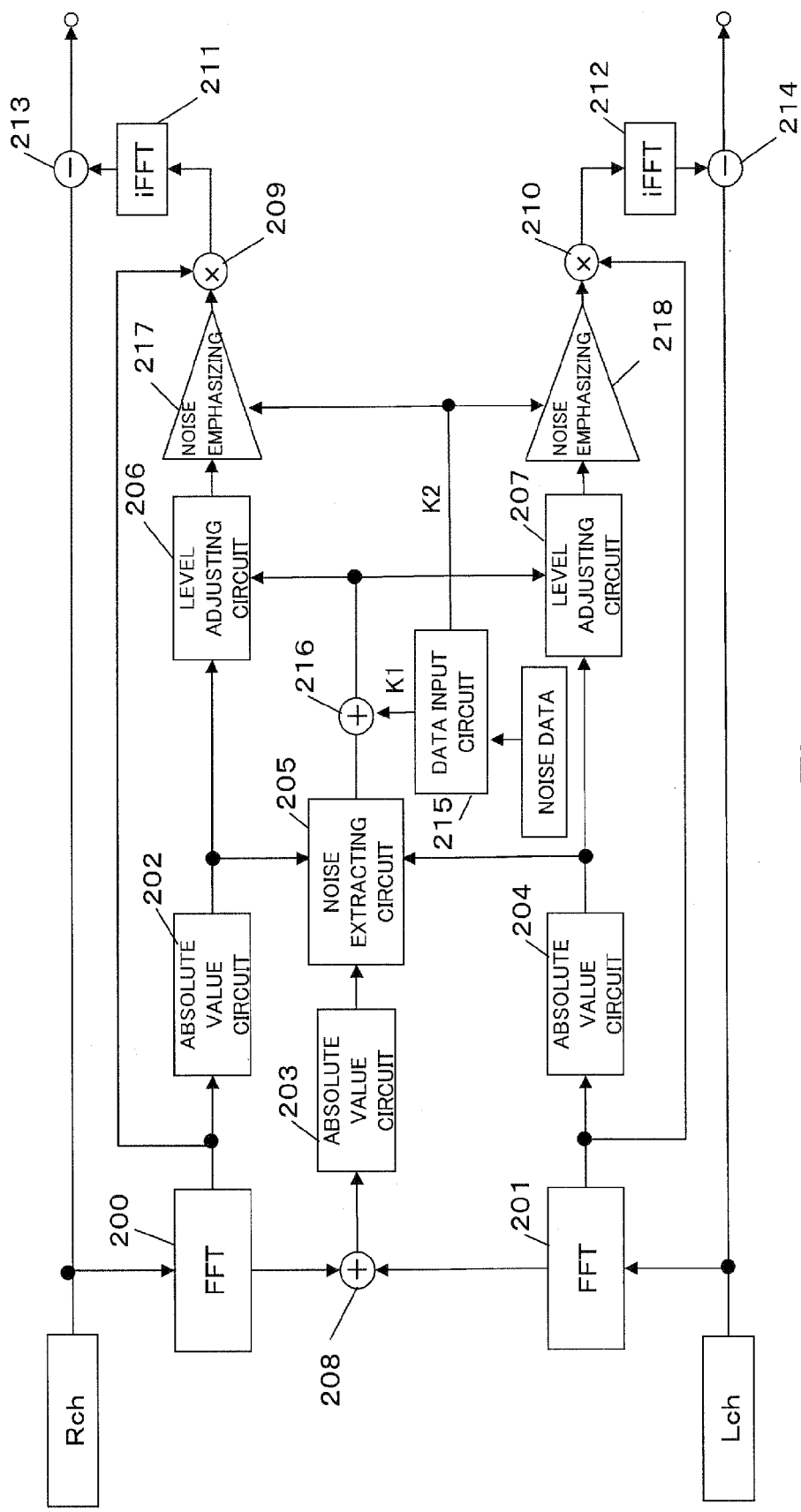
FIG. 5 is a block diagram of a noise cancelling unit.

In order to cancel even the remaining noise (second noise) which cannot be removed in such a configuration of the noise cancelling unit 180A shown in FIG. 4, the noise cancelling unit 180 according to this embodiment has the configuration shown in FIG. 5. The noise cancelling unit 180 shown in FIG. 5 performs a noise cancelling operation by using characteristic data about the remaining noise component (hereinafter, referred to as noise characteristic data) to cope with the zooming operation, the focusing operation or the like in the digital camera 100 as described below.

Specifically, the noise cancelling unit 180 records the characteristic data about the remaining noise component in the flash memory 142 in advance, and performs the noise-cancellation by using the noise characteristic data recorded in the flash memory 142. As a result, even the noise which would be left uncancelled in the basic noise cancelling unit 180A can be reduced, and therefore, more effective noise-cancellation can be performed.

Further, the remaining noise component in the noise cancelling unit 180A described with reference to FIG. 4 differs for the operation performed by the digital camera 100. For example, the remaining noise component during the zooming operation of the digital camera 100 is different from the remaining noise component during the focusing operation of the digital camera 100.

The flash memory 142 of the noise cancelling unit 180 of the embodiment records noise characteristic data corresponding to the respective operations of the digital camera 100. Therefore, the noise cancelling unit 180 can perform appropriate noise-cancellation for each operation of the digital camera 100.

As a configuration for implementing that noise-cancellation, the noise cancelling unit 180 shown in FIG. 5 will be described as an example in this embodiment. As shown in the figure, the noise cancelling unit 180 shown in FIG. 5 is different from the basic noise cancelling unit 180A shown in FIG. 4 by further including a noise characteristic data input circuit 215, an adding circuit 216, and noise emphasizing circuits 217, 218. These circuits are adapted to function as a noise cancelling unit together with the multiplying circuits 209, 210 and subtracting circuits 214, 213.

Under the control of the controller 130 according to the operation state of the digital camera 100, the noise characteristic data input circuit 215 reads out the corresponding noise characteristic data stored in the flash memory 142 and inputs the data into the adding circuit 216. Here, the flash memory 142 stores the noise characteristic data to be used for each operation of the digital camera 100 (addition coefficient data (K1) and multiplier coefficient data (K2)). For example, the flash memory 142 stores the noise characteristic data to be used for zooming operation, the noise characteristic data to be used for focusing operation, and the like as described later.

<About Noise Characteristic Data>

Now, noise characteristic data stored in the flash memory 142 will be described with reference to FIG. 6.

As shown in the figure, the noise characteristic data is stored in the flash memory 142 in the form of a plurality of table data sheets corresponding to the respective operations of the digital camera 100.

For example, the sheet (a) in the figure is the noise characteristic data used for zooming operation. The sheet (b) is the noise characteristic data used for focusing operation. The sheet (c) is the noise characteristic data used in the case where different operations such as the zooming operation and the focusing operation are performed at the same time.

In addition, the addition coefficient data and the multiplier coefficient data (hereinafter, sometimes referred to as gain data) corresponding to the frequency are located in the noise characteristic data. The noise characteristic data is maintained in the form of table data in which the frequency, the addition coefficient data (K1), and the multiplier coefficient data (K2) are associated with one another. For example, the noise characteristic data for zooming operation (a) is maintained in the form of table data in which the frequency (a1), the addition coefficient data (a2) K1, and the multiplier coefficient data (a3) K2 are associated with one another. The addition coefficient data K1 is input into the adder 216 via the noise characteristic data input circuit 215. The multiplier coefficient data K2 is input into the noise emphasizing circuits 217, 218 as gain data via the noise characteristic data input circuit 215 as described later.

Here, the addition coefficient data (0.3, 0.8, 0.3) circled in the figure corresponds to FIG. 7C (A) to be described later. Similarly, the multiplier coefficient data (1.2, 1.5, 1.2) corresponds to FIG. 7C (B) to be described later. The above description is also applied for other cases such as the noise characteristic data corresponding to focusing operation (b), and the noise characteristic data corresponding to the case where different operations are performed at the same time (c).

With the noise characteristic data as described above, the noise which remains as it has escaped the extraction of the noise extracting circuit 205 corresponding to the operation of the digital camera 100 can be reduced, so that more appropriate noise-cancellation can be performed. Further, the flash memory 142 stores the noise characteristic data which differs for the zoom speed even of the same zooming operation (a) (addition coefficient data K1 and multiplier coefficient data K2). Similarly, the flash memory 142 stores the noise characteristic data which differs for the focus speed even of the same focusing operation (b) (addition coefficient data K1 and multiplier coefficient data K2). Therefore, the noise cancelling unit 180 is advantageous in that it can perform appropriate noise-cancellation correspondingly to the operating speed even of the same operation.

Further, the flash memory 142 stores the noise characteristic data (addition coefficient data K1 and multiplier coefficient data K2) which differs for the operating speed even of the noise characteristic data (c) in the case where different operations are performed at the same time, for example, in the case where zooming operation and focusing operation are performed at the same time. The noise characteristic data in the case where different operations are performed at the same time (c) may be different from the simple sum of the noise characteristic data for each operation. The digital camera 100 according to this example is advantageous in that it can perform appropriate noise-cancellation and complicated noise-cancellation even in the case where a plurality of operations are performed at the same time as described above.

Subsequently, the addition coefficient data K1 among the noise characteristic data is input into the adding circuit 216 via the noise characteristic data input circuit 215. The adding circuit 216 adds the addition coefficient data K1, which is indicated by the noise characteristic data corresponding to the operation state, to the noise signal extracted by the noise extracting circuit 205. At this moment, the controller 130 obtains the exact operation state of the digital camera 100 by observing the state of the operation unit 150 of the digital camera 100 or by observing drive instructing information to be sent to the focus lens 111 or the zoom lens 112. Then, according to the operation state of the digital camera 100, the controller 130 controls which noise characteristic data to be read out from the flash memory 142 by the noise characteristic data input circuit 215. For example, when the digital camera 100 is in the zooming operation state, the controller 130 controls the noise characteristic data input circuit 215 to read out the noise characteristic data for the zooming operation (a) from the flash memory 142.

Subsequently, the noise signal to which the signal indicated by the noise characteristic data corresponding to the operation state has been added is divided into two paths. The noise signal in one of the paths undergoes level-adjustment in the level adjusting circuit 206, and is input into the noise emphasizing circuit 217. The noise signal in the other path undergoes level-adjustment in the level adjusting circuit 207, and is input into the noise emphasizing circuit 218.

Into the noise emphasizing circuit 217, the multiplier coefficient data K2 among the above described noise characteristic data is input from the noise characteristic data input circuit 215 as the gain data. Then, the noise emphasizing circuit 217 amplifies the gain indicated by the multiplier coefficient data K2 corresponding to the operation state against the output signal which has undergone the level-adjustment in the level adjusting circuit 206.

Into the noise emphasizing circuit 218, the multiplier coefficient data K2 among the noise characteristic data is input from the noise characteristic data input circuit 215 as the gain data. Then, the noise emphasizing circuit 218 amplifies the gain indicated by the multiplier coefficient data K2 corresponding to the operation state against the output signal which has undergone the level-adjustment in the level adjusting circuit 207.

Subsequently, the multiplying circuit 209 multiplies the output signal from the noise emphasizing circuit 217 by the output signal from the FFT 200, and outputs the result to the iFFT 211.

Similarly, the multiplying circuit 210 multiplies the output signal from the noise emphasizing circuit 218 by the output signal from the FFT 201, and outputs the result to the iFFT 212.

With the above described configuration, even if the noise component remains as it has escaped the extraction of the noise extracting circuit 205, the signal equivalent to the signal generated in the case where the noise is completely extracted can be generated by adding the signal indicated by the corresponding noise characteristic data to the output signal from the noise extracting circuit 205 and by multiplying the result by the gain.

Subsequently, after the output signal from the multiplying circuit 209 (the signal equivalent to the signal in the case where the noise is completely extracted) coming through the iFFT 211, the signal is subtracted from the audio signal on the Rch side in the subtracting circuit 213. Similarly, after the output signal from the multiplying circuit 209 coming through the iFFT 212, the signal is subtracted from the audio signal on the Lch side in the subtracting circuit 214. As such, the subtracting circuits 213, 214 function as cancelling units. Therefore, more effective noise-cancellation can be performed.

[2. About Recording of the Noise Characteristic Data]

A specific method of recording the noise characteristic data according to the operation state of the digital camera 100 shown in FIG. 6 will be described with reference to FIGS. 7A-7C. FIGS. 7A-7C are diagrams for describing the specific method of recording of the noise characteristic data. Recording of the noise characteristic data described here is assumed to be performed at the time of manufacturing or factory shipments of the digital camera 100, for example, but the recording timing is not limited to that. In addition, the noise characteristic data is desirably recorded for each model or the like of the digital camera 100, for example, but the present embodiment is not limited to that.

First, the digital camera 100 is located in an ideal nearly silent environment like a soundproof chamber, and without any motor operation such as zooming operation to make the source of noise performed, the obtained audio signal is recorded. That is, the audio signal, which is collected by the non-directional microphones L162, R163, then subjected to the directed synthesizing processing by the directed synthesizing unit 170, and coming through the basic noise cancelling unit 180 shown in FIG. 4, is recorded. Since no motor operation is performed and ambient sounds are quite small at this moment, it is assumed that the audio signal only includes the circuit noise produced inside the digital camera 100. That audio signal will be called "reference audio data" in the description below. FIG. 7A is a conceptual diagram of frequency characteristics of the reference audio data.

Next, the digital camera 100 is located in an ideal nearly silent environment like a soundproof chamber, and with respective motor operations including a zooming operation to make the source of noise performed, the obtained audio signal is recorded. For example, while the digital camera 100 in a soundproof chamber is caused to perform only the zooming operation, the obtained audio signal is recorded. That is, the audio signal, which is collected by the non-directional microphones L162, R163 during the zooming operation, then subjected to the directed synthesizing processing by the directed synthesizing unit 170, and coming through the basic noise cancelling unit 180 shown in FIG. 4, is recorded. Since the ambient sounds are quite small, it is assumed that the audio signal at this moment includes a circuit noise and a remaining noise component after the noise-cancellation performed on the noise caused by the zooming operation. That audio signal will be called "zooming audio data" in the description below. Similarly, the digital camera 100 records the zooming audio data stepwise according to the speed (frequency) of the zooming operation. FIG. 75 is a conceptual diagram of frequency characteristics of the zooming audio data at a certain speed (frequency).

Here, the dashed line A shown in FIG. 7B denotes the reference audio data corresponding to FIG. 7A. The dotted line B denotes the audio data before the basic noise cancelling unit 180A. The solid line C denotes the audio data after the basic noise cancelling unit 180A. The arrows D indicate the audio data of the component corresponding to the remaining noise to be described later with reference to FIG. 7C.

As shown in the figure, the remaining noise (D) in the area of high frequency f is relatively small. For that reason, it is understood that the noise in the area of high frequency f is extracted by the noise extracting unit 205 of the basic cancelling unit 180A to some extent, therefore, can be cancelled to some extent.

On the other hand, the remaining noise (D) in the area of low frequency f is bigger than that in the area of high frequency f. For that reason, it is understood that a large part of the noise (D) in the area of low frequency f is left as the remaining noise which cannot be cancelled even by the basic cancelling unit 180A.

Subsequently, the remaining noise component caused by the zooming operation (second noise) can be obtained by subtracting the reference audio data shown in FIG. 7A from the zooming audio data shown in FIG. 7B. FIG. 7C is a diagram illustrating the frequency characteristics of the remaining noise component.

Figure 6:
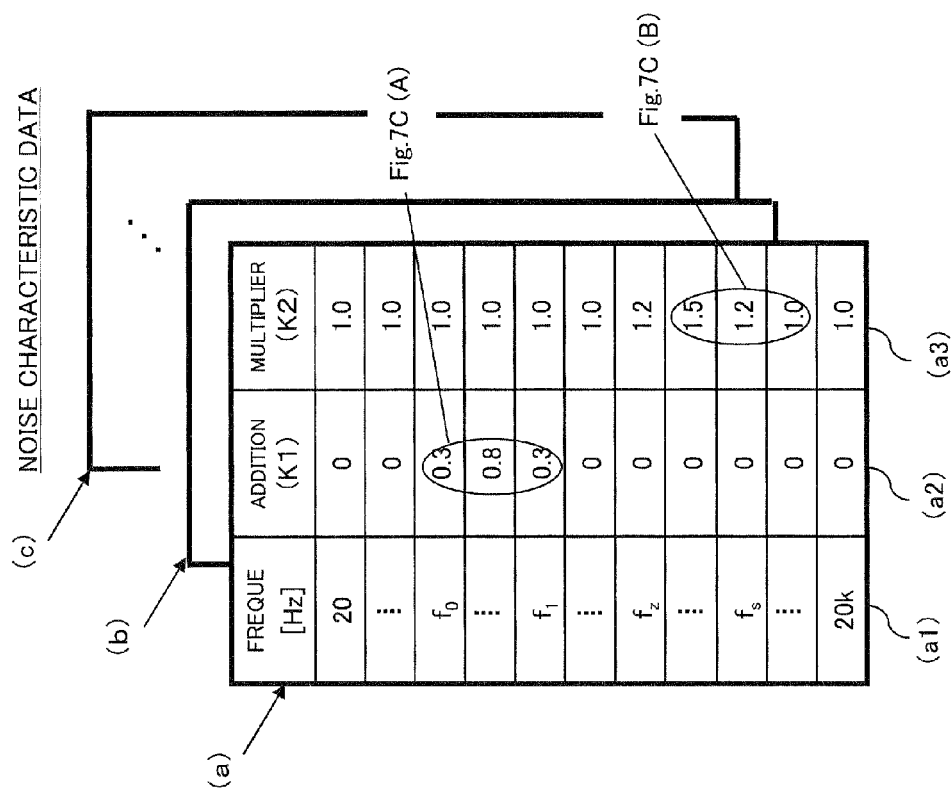
FIG. 6 is a diagram illustrating an example of noise characteristic data.

Here, the remaining data A in the area of low frequency (f0-f1) in FIG. 7C corresponds to the addition coefficient data K1 (0.3, 0.8, 0.3) shown in FIG. 6. Similarly, the remaining data B in the area of high frequency (f2-f3) in FIG. 7C corresponds to the multiplier coefficient data K2 (1.2, 1.5, 1.2) shown in FIG. 6.

That is, in the configuration of the noise cancelling unit 180 shown in FIG. 5, first, the noise characteristic data input from the noise characteristic data input circuit 215 (addition coefficient data K1) is reduced to zero, and the gains of the noise emphasizing circuits 217, 218 are increased until the remaining noise components shown in FIG. 7C are lowered below a predetermined level. Then, the gains of the noise emphasizing circuits 217, 218 at the moment when the remaining noise components shown in FIG. 7C are lowered below the predetermined level are set as the multiplier coefficient data K2 (remaining data B) in the noise characteristic data.

When the gains are increased, the remaining noise components remain at any cost as for the noise in the low frequency band which cannot be extracted by the noise extracting unit 205. That remaining noise components are set as the addition coefficient data K1 (remaining data A) which is input by the noise characteristic data input circuit 215 shown in FIG. 5 in the digital camera 100 according to the first embodiment.

The remaining noise components shown in FIG. 7D differ correspondingly for each operation such as zooming operation and focusing operation. Therefore, as shown in FIG. 6, the noise characteristic data corresponding to each operation (table data) also differs in the addition coefficient value, the multiplier coefficient value and the like for each frequency.

[3. Functional Effect]

As described above, according to the first embodiment, at least effects (1) to (3) shown below can be obtained.

(1) If a remaining noise component which cannot be extracted even by the noise extracting unit 205 in the basic noise cancelling unit 180A is present, it can be cancelled by using the noise characteristic data. Therefore, the first embodiment is advantageous in that it can perform noise-cancellation on the remaining noise more effectively.

(2) The remaining noise component which cannot be extracted by the noise extracting unit 205 of the basic noise cancelling unit 180 differs for each operation such as zooming operation and focusing operation. In the first embodiment, as shown in FIG. 6, the noise characteristic data corresponding to each operation is stored in the flash memory 142. The first embodiment is advantageous in that it can cancel the remaining noise corresponding to each operation by using the noise characteristic data.

(3) In addition, the noise component which cannot be extracted by the noise extracting unit differs for each speed (frequency) of operation such as zooming operation and focusing operation. In the first embodiment, as shown in FIG. 6, the noise characteristic data corresponding to each operating speed is stored in the flash memory 142. The first embodiment is advantageous in that it can cancel the remaining noise corresponding to each operating speed (frequency) by using the noise characteristic data.

As such, it is apparent that the noise cancelling device according to the first embodiment is advantageous in that it can cancel even the remaining noise produced by the digital camera 100, therefore, it can perform more effective noise-cancellation.

It is a matter of course that the noise cancelling device according to the first embodiment is not limited to the digital camera. For example, it can be applied to devices having a recording function such as a camera with built-in lens, an interchangeable lens camera, a twin-lens 3D camera, a movie camera, as well as an information terminal with camera, a voice recorder, and the like.

Industrial Applicability

This disclosure can be applied to a noise cancelling device. However, application of the noise cancelling device is not limited to the digital camera. For example, it can be applied to devices having a recording function such as a movie camera, an information terminal with camera, and a voice recorder.

What is claimed is:

1. A noise cancelling device comprising:
    an extracting unit configured to extract a first noise from a first signal, the first signal being based on an input audio signal;
    a storing unit configured to store noise characteristic information on a second noise, the second noise being a noise corresponding to a mechanical vibration noise made by a predetermined operation of an apparatus having the noise cancelling device, wherein:
        the second noise is indicated by a second signal obtained by subtracting the extracted first noise from the first signal; and
        the second noise is a residual noise which remains after the first noise has been extracted by the extracting unit; and
    a cancelling unit configured to perform cancelling processing for cancelling a noise on the input audio signal based on the first noise and the noise characteristic information on the second noise.

2. The noise cancelling device according to claim 1, wherein the noise characteristic information includes adding data which is associated with a frequency, and
    the cancelling unit comprises:
    a data input circuit configured to input the adding data by reading the adding data from the storing unit;
    an adding circuit configured to add the adding data inputted from the data input circuit to the first noise; and
    a subtracting circuit configured to subtract a noise signal generated based on an output signal from the adding circuit, from the input audio signal.

3. The noise cancelling device according to claim 2, wherein the noise characteristic information includes multiplying data which is associated with a frequency,
    the cancelling unit further comprises a noise emphasizing circuit configured to emphasize a noise of an input signal to be input into the noise emphasizing circuit based on the multiplying data input from the data input circuit, the input signal being an output from the adding circuit having undergone a level adjustment, and
    the subtracting circuit subtracts the noise signal generated based on an output signal from the noise emphasizing circuit, from the input audio signal.

4. The noise cancelling device according to claim 3, wherein the cancelling unit further comprises a multiplying circuit configured to multiply the input audio signal input to the cancelling unit by an output signal from the noise emphasizing circuit, and
    the subtracting circuit subtracts the noise signal from the input audio signal, the noise signal being generated based on an output signal from the multiplying circuit.

5. The noise cancelling device according to claim 1, wherein the apparatus is an imaging device and the storing unit stores the noise characteristic information on the second noise corresponding to each of a plurality of driving operations of the imaging device which includes the noise cancelling device.

6. The noise cancelling device according to claim 5, wherein the storing unit stores the noise characteristic information on the second noise corresponding to an operating speed of each of the driving operations.

7. The noise cancelling device according to claim 1, wherein the cancelling unit selectively uses the noise characteristic information on the second noise stored in the storing unit according to an operation state of a driving unit.

8. The noise cancelling device according to claim 1, further comprising:
   a pair of non-directional microphone units; and
   a conversion unit configured to convert output signals from the pair of non-directional microphone units into a directional signal by performing directional synthesizing processing on the output signals from the pair of non-directional microphone units, wherein
   the extracting unit extracts the first noise from the directional signal converted by the conversion unit.

* * * * *